US012802589B2

(12) United States Patent
Dyson et al.

(10) Patent No.: US 12,802,589 B2
(45) Date of Patent: Nov. 17, 2026

(54) INTERACTIVE VIDEO GAME EXHIBIT HAVING AN ASSOCIATED PERIODIC TABLE AND METHOD

(71) Applicant: Margaret Woodbury Strong Museum, Rochester, NY (US)

(72) Inventors: Jon-Paul C. Dyson, Webster, NY (US); Elliot Drury, Rochester, NY (US); Daniel Resch, Penfield, NY (US); Andrew Borman, Rochester, NY (US); Byron T. Fong, Rochester, NY (US)

(73) Assignee: Margaret Woodbury Strong Museum, Rochester, NY (US)

( * ) Notice: Subject to any disclaimer, the term of this patent is extended or adjusted under 35 U.S.C. 154(b) by 657 days.

(21) Appl. No.: 18/112,021

(22) Filed: Feb. 21, 2023

(65) Prior Publication Data

US 2023/0267853 A1 Aug. 24, 2023

Related U.S. Application Data

(60) Provisional application No. 63/312,251, filed on Feb. 21, 2022.

(51) Int. Cl.
*G09B 23/24* (2006.01)
*G09B 5/06* (2006.01)
(Continued)

(52) U.S. Cl.
CPC ............... *G09B 23/24* (2013.01); *G09B 5/06* (2013.01); *A63F 2009/2489* (2013.01);
(Continued)

(58) Field of Classification Search
CPC .......... G09B 23/24; G09B 5/06; G09B 19/00; A63G 31/00; A63F 2009/2489; A63F 13/235
See application file for complete search history.

(56) References Cited

U.S. PATENT DOCUMENTS 7,614,958 B2 11/2009 Weston et al.
7,749,089 B1 * 7/2010 Briggs .................... A63F 13/23 472/136

(Continued)

OTHER PUBLICATIONS

Atomidoodle, Hero Factor Games, LLC, retrieved from https://play.google.com/store/apps/details?id=com.herofactorgames.atomidoodle&hl=en_US&gl=US.

(Continued)

*Primary Examiner* — Jack Yip

(74) *Attorney, Agent, or Firm* — Brian B. Shaw; Jodi A. Reynolds; Harter Secrest & Emery LLP

(57) ABSTRACT

An immersive exhibit of video game related interactives includes a periodic table representing a display and a tally of identified activities within predetermined categories in the table. The categories are generic verbs or terms encompassing subsets of interactive video game actions, the identified activities are species, such as the "verbs" or activities of the video games like jump, solve, sort, or punch. A first subset of the plurality of video game related interactives are physically located within a first gallery representing a first category and a second subset of video game related interactives are physically located within a second gallery of the exhibit. An objective of the exhibit is the completion of identified activities in the periodic table by interacting with the video game related interactives having the identified activities.

18 Claims, 10 Drawing Sheets

(51) Int. Cl.

| | |
|---|---|
| *A63F 9/24* | (2006.01) |
| *A63F 13/235* | (2014.01) |
| *A63G 31/00* | (2006.01) |
| *G09B 19/00* | (2006.01) |

(52) U.S. Cl.

CPC ............ *A63F 13/235* (2014.09); *A63G 31/00* (2013.01); *G09B 19/00* (2013.01)

(56) References Cited

U.S. PATENT DOCUMENTS

| | | | | |
|---|---|---|---|---|
| 9,162,149 | B2 | 10/2015 | Weston et al. | |
| 9,396,618 | B2 | 7/2016 | Weston et al. | |
| 9,440,144 | B2 | 9/2016 | Mikhailov | |
| 9,802,126 | B2 | 10/2017 | Reiche et al. | |
| 10,583,357 | B2 | 3/2020 | Barney et al. | |
| 10,685,036 | B2 | 6/2020 | Berwick et al. | |
| 10,864,443 | B2 | 12/2020 | Eatedali et al. | |
| 10,974,135 | B2 | 4/2021 | Aman et al. | |
| 11,090,567 | B2 | 8/2021 | Eatedali et al. | |
| 2004/0092311 | A1* | 5/2004 | Weston | A63F 13/21 463/43 |
| 2006/0154726 | A1* | 7/2006 | Weston | A63F 13/31 463/36 |
| 2009/0055205 | A1* | 2/2009 | Nguyen | G07F 17/3241 348/169 |
| 2009/0239663 | A1* | 9/2009 | Ferdinand | G07F 17/3237 463/43 |
| 2012/0258802 | A1* | 10/2012 | Weston | A63F 13/95 463/43 |
| 2013/0159040 | A1* | 6/2013 | Sarmenta | G06Q 10/06 463/43 |
| 2013/0296007 | A1* | 11/2013 | Hanson | G09B 23/24 463/10 |
| 2015/0290552 | A1* | 10/2015 | Owoc | A63F 3/0423 472/75 |
| 2015/0379046 | A1* | 12/2015 | Sundaresan | G06F 16/5854 707/772 |
| 2019/0015747 | A1* | 1/2019 | Thompson | A63F 13/53 |
| 2020/0360826 | A1* | 11/2020 | Schmidt | E04H 3/10 |
| 2021/0016185 | A1* | 1/2021 | Linguanti | A63F 13/67 |
| 2021/0368316 | A1* | 11/2021 | Tiwari | G06Q 20/20 |
| 2022/0398799 | A1* | 12/2022 | DuPlessie | A63F 13/217 |
| 2024/0042329 | A1* | 2/2024 | Duplessie | A63F 13/90 |

OTHER PUBLICATIONS

Pellerin et al. (2009) “Player Profile Management on NFC Smart Card for Multiplayer Ubiquitous Games,” International Journal of Computer Games Technology 2009(323095): 1-9.

* cited by examiner

INTERACTIVE VIDEO GAME EXHIBIT HAVING AN ASSOCIATED PERIODIC TABLE AND METHOD

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present disclosure relates to an exhibit that encourages guests to explore the history and structures of video games by providing areas of challenges inspired by the key actions (activities) of video games. Generally, a guest acquires a tag that tracks their engagement with a variety of the video game related interactives in the exhibit, wherein the completion or participation in each video game related interactive awards the guest at least one identified activity or achievement in a periodic table, wherein the periodic table includes the set of achievements (identified activities) organized as categories, such as video game actions, which can be represented as verbs.

Description of Related Art

Museums are a valuable resource of the community and the culture. Museums are often directed to preserving the past, and offer a view of a subject across time. While museums offer significant material for education, museums have traditionally been limited in their ability to use the power of play to enhance the educational experience.

In one aspect in the history of play, board games were one of the dominant forms of play. These board games often included a portable game surface with markings, pieces to move across the board in accordance with the markings, and in select configurations additional cards with questions or directions. In the early 1970's, consumer video games were introduced into the mainstream, wherein these included video games produced by companies such as, Magnavox, Sega, Namco, and Atari. The attraction of video games is based on multiple factors including continuous play, where gamers move throughout multiple instances to achieve missions on levels of varying difficulty and in a broad spectrum of situational circumstances. In a physical board game with only a single layout and set of rules, there is no reasonable equivalent to instances and levels, offering a distinct advantage to the video games. In addition, beginning in the 1990's, video games can connect a single gamer with many other gamers in the virtual world.

There has been a tremendous growth over the last 50 years in video games, and particularly in their presentation, complexity, interaction, style of play, as well as game theory. Thus, the history of videos games holds great potential educational value. However, traditional museum exhibits and approaches may not facilitate these potential educational values.

BRIEF SUMMARY OF THE INVENTION

Thus, the present disclosure provides an exhibit that creates educational experiences by using the power of play to enhance learning. The disclosed exhibit is configured so that guests are learners that develop concepts and skills through meaningful play, wherein the play supports physical, emotional, cognitive, and social development, and the guests are active participants in guiding their own learning, as each guest can have a unique path with individual learning preferences and styles. The present video game related interactives and the corresponding periodic table make learning easier as the guests make connections between their experiences and the new information.

The present disclosure is directed to an immersive interactive exhibit, such as for an interactive museum, wherein the exhibit includes a plurality of video game related interactives. Guests obtain a tag, for example an RFID tag, to which they can associate a name and/or avatar. As the user engages a given video game related interactive, their tag is associated with the video game related interactive and their name and/or avatar and depending on the video game, their name or avatar may appear in the given video game related interactive. The results of their participation or completion of the video game related interactive are received by a computer and tallied into a set of available achievements, such as identified activities, wherein the earned achievements are stored in the computer and plotted on a tabular array, such as a periodic table, relative to a total set of available achievements from all the video game related interactives in the exhibit. That is, each video game related interactive will only have a subset of the total set of available achievements (identified activities). Thus, the user must engage with or complete multiple video game related interactives to obtain the available achievements, which are transmitted to the computer and tallied to be selectively displayed in the tabular array, such as a periodic table.

There are multiple public displays throughout the exhibit where the guest (via their associated tag, such as an RFID tag) can see their obtained achievements as tallied on the periodic table and thus their progress, thereby also identifying which other video game related interactives they need to interact with and with what activities to obtain further achievements, and thereby fulfill or complete the periodic table.

In one configuration, the present disclosure provides an immersive exhibit for a guest, wherein the immersive exhibit includes a first gallery in the exhibit; a spaced apart second gallery in the exhibit; a database having a set of categories including at least a first category and a second category, each category including a plurality of identified activities as achievements; a plurality of different video game related interactives configured to generate game data corresponding to an interaction with the guest, wherein each of the plurality of video game related interactives is a member of at least one category and has at least one assigned identified activity within the at least one category, wherein a first subset of the plurality of video game related interactives assigned the first category are physically located in the first gallery and a second subset of the plurality of video game related interactives assigned the second category are physically located in the second gallery; a public display comprising a periodic table in a tabular array of the plurality of categories with each identified activity within the respective category being contiguous; a tag associated with the guest; a reader configured to associate a given tag with a given one of the plurality of video game related interactives; and a computer operably connected to the reader, the database, the display, and the plurality of video game related interactives, the computer configured to receive game data from the given one of the plurality of video game related interactives and tabulate a tally of the associated tag corresponding to the set of categories and the activity with the at least one category, wherein the computer is further configured to selectively display the tally on the periodic table.

The present disclosure further provides a method of providing an immersive exhibit for a guest, the method including associating each of a plurality of video game related interactives with one of a plurality of categories, a first subset of the plurality of video game related interactives associated with a first category and located in a first gallery and a second subset of the plurality of video game related interactives associated with a second category and located in a second gallery, wherein the first category generically describes the first subset of the plurality of video game related interactives and the second category generically describes the second subset of the plurality of video game related interactives; assigning each of the plurality of video game related interactives in a given category at least one of a plurality of identified activities, wherein the at least one of the assigned plurality of identified activities is a species of the given category associated; linking, by a computer, a portable tag to the guest; recognizing the tag at a given one of the plurality of video game related interactives to designate a selected one of the plurality of video game related interactives; generating, by interaction by the guest, game data at the selected one of the plurality of video game related interactives corresponding to the interaction with the selected one of the plurality of video game related interactives by the guest; receiving, at the computer, the generated game data from the selected one of the plurality of video game related interactives and associating the received game data with the recognized tag; tallying, by the computer, the received game data for recognized tag; and displaying, at a public display and in response to guest input of the recognized tag, at least a portion of the tallied game data for the recognized tag in a periodic table, the periodic table including the plurality of categories and the identified activities, wherein the identified activities within the respective category are contiguous in the periodic table.

The following will describe embodiments of the present disclosure, but it should be appreciated that the present disclosure is not limited to the described embodiments and various modifications of the invention are possible without departing from the basic principles. The scope of the present disclosure is therefore to be determined solely by the appended claims.

BRIEF DESCRIPTION OF THE SEVERAL VIEWS OF THE DRAWING(S)

DETAILED DESCRIPTION OF THE INVENTION

The present disclosure provides an immersive video game related interactive exhibit 10 for a guest 12, wherein the exhibit can be a stand-alone exhibit or incorporated into a larger collection such as a museum. As used herein, the term exhibit encompasses a collection of items, such as artifacts, artwork, or scientific specimens, that are displayed to the public for educational or cultural purposes, wherein the items can also include video game related interactives as set forth herein. Exhibits 10 are typically curated and organized in a specific theme or topic and may include interactive elements, such as videos, audio recordings, or hands-on activities, to enhance the experience of a visitor.

Figure 1:
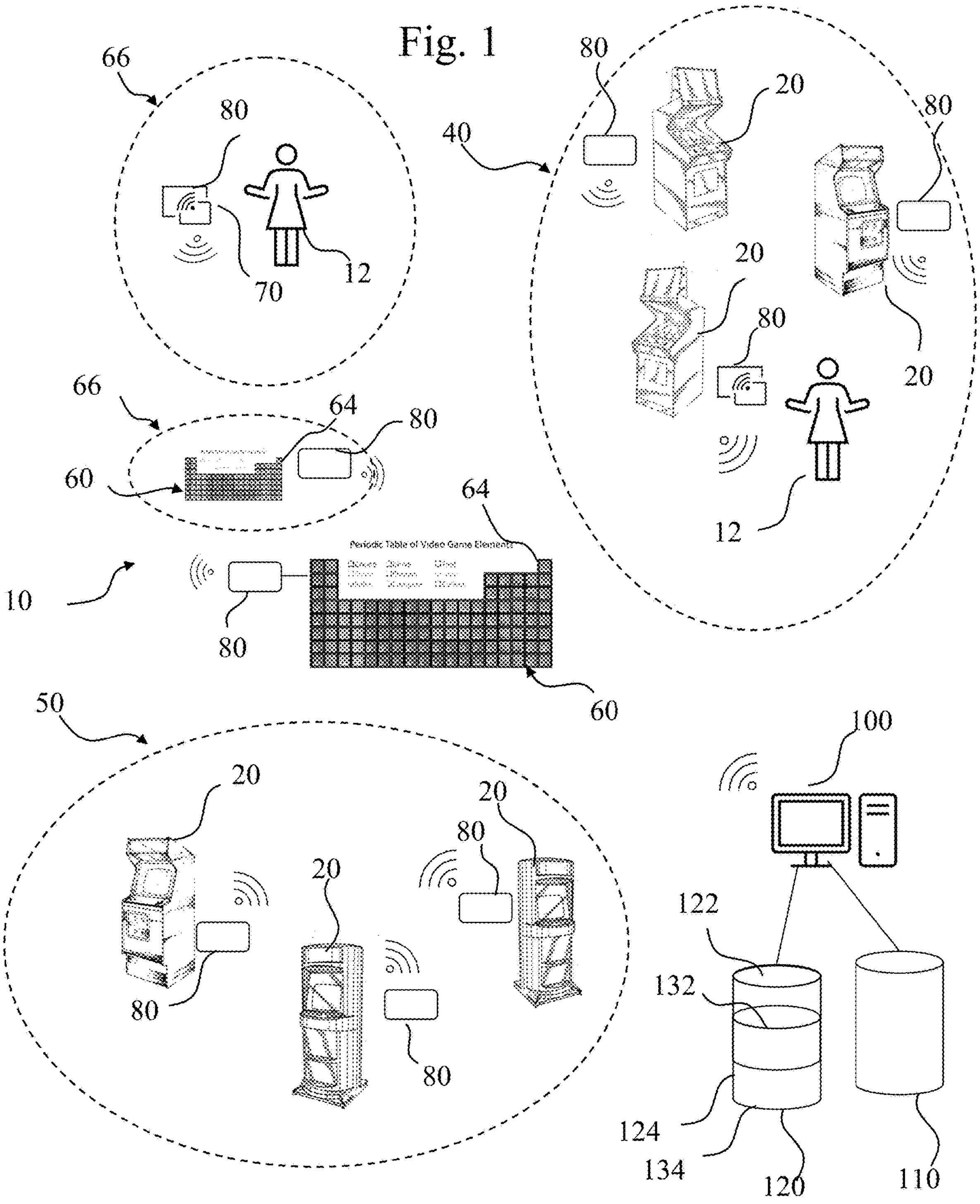
FIG. 1 is a schematic of the components of the immersive exhibit.
Figure 2A:
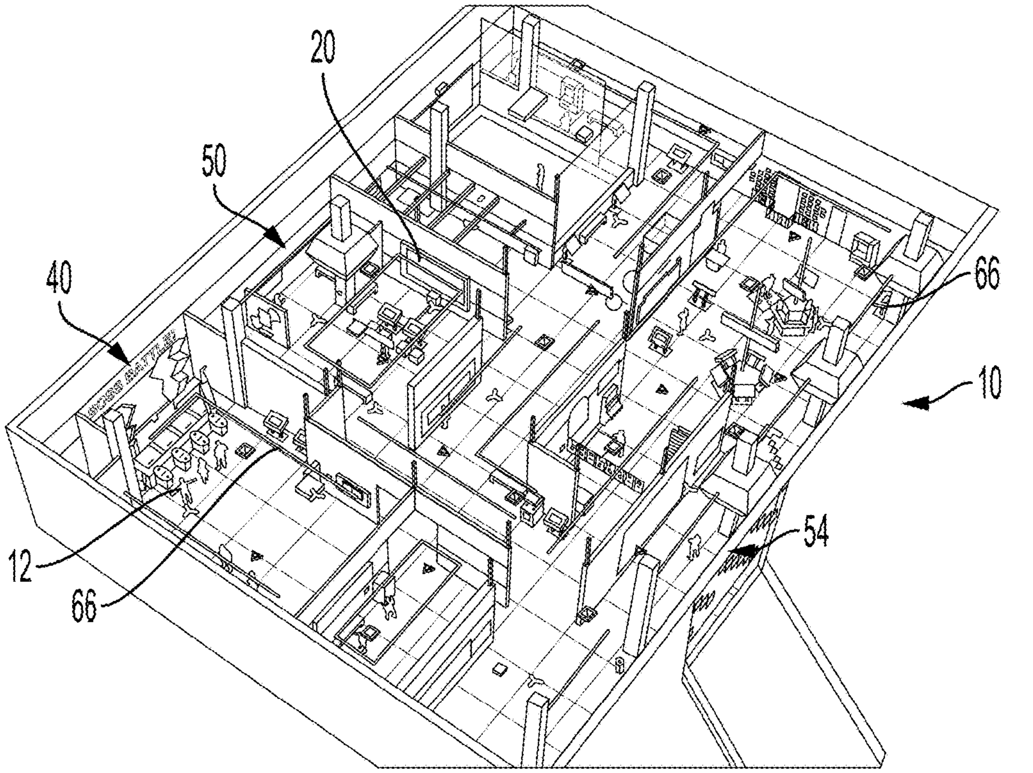
FIG. 2A is a perspective view of a portion of the exhibit showing first configuration of a plurality of galleries including an orientation gallery.
Figure 2B:
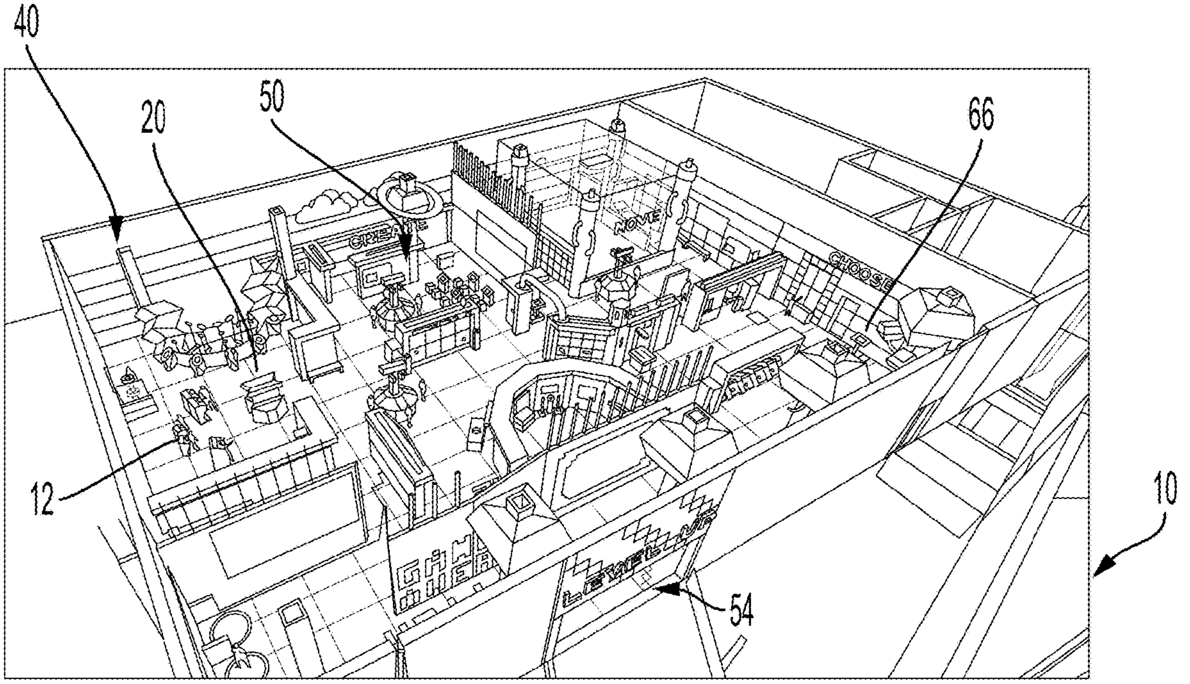
FIG. 2B is a perspective view of a portion of the exhibit showing second configuration of a plurality of galleries including an orientation gallery.
Figure 3A:
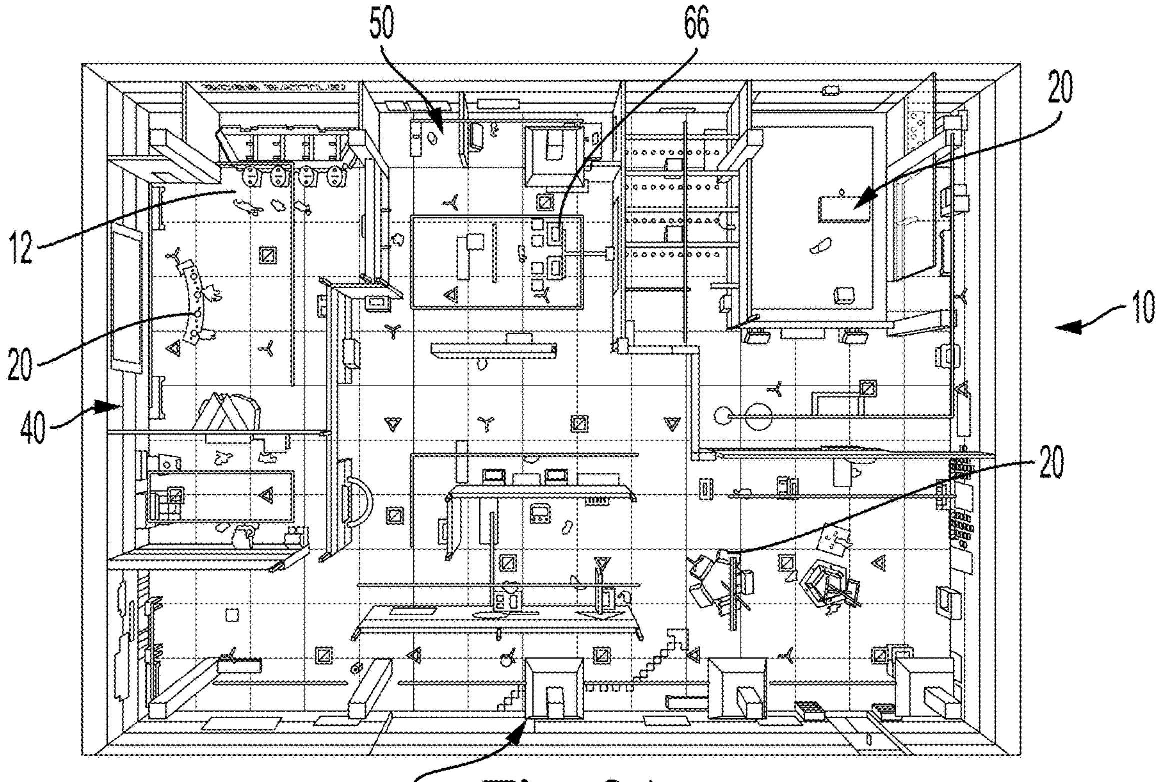
FIG. 3A is a top plan view of the exhibit of FIG. 2A.
Figure 3B:
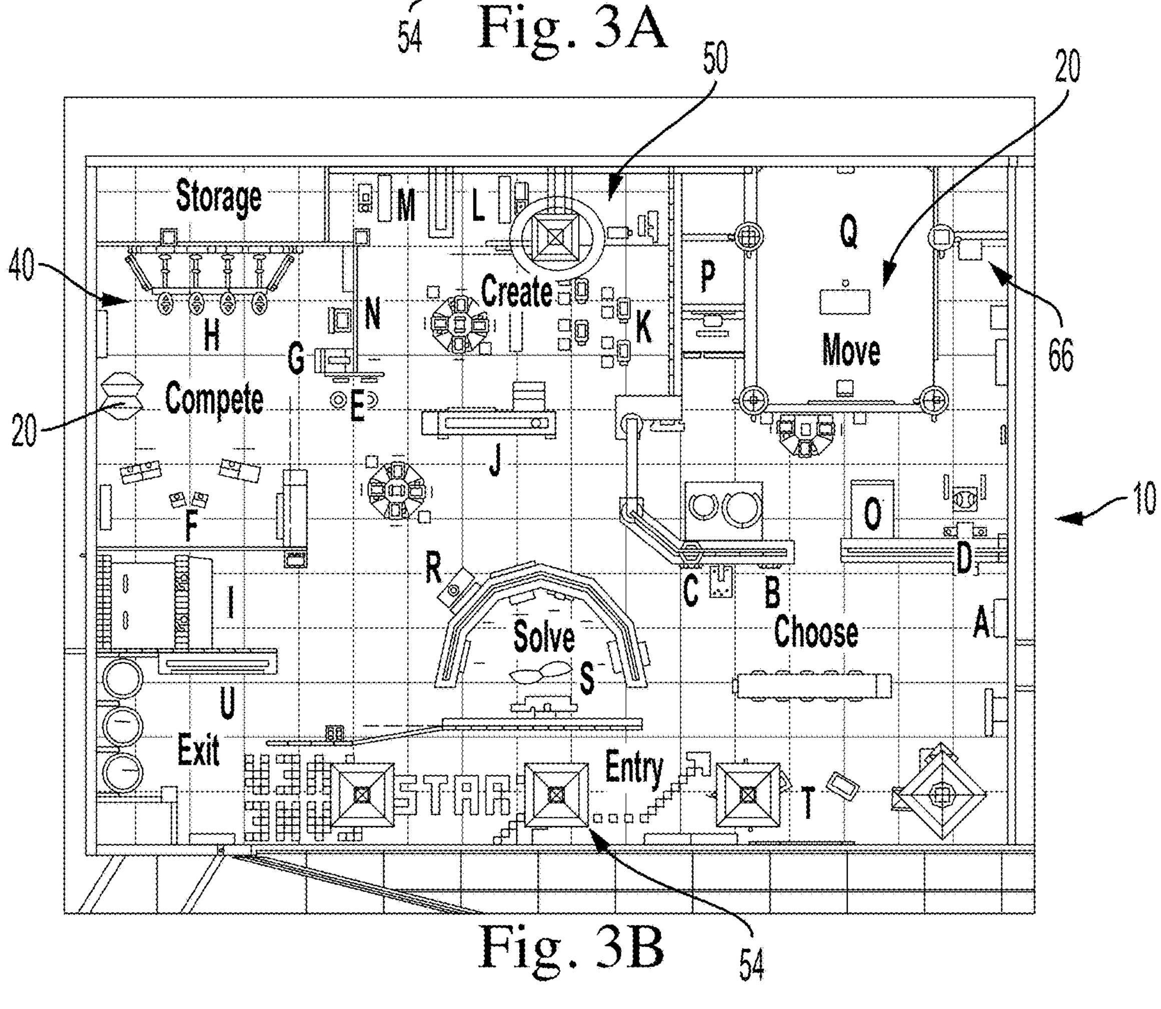
FIG. 3B is a top plan view of the exhibit of FIG. 2B.
Figure 4:
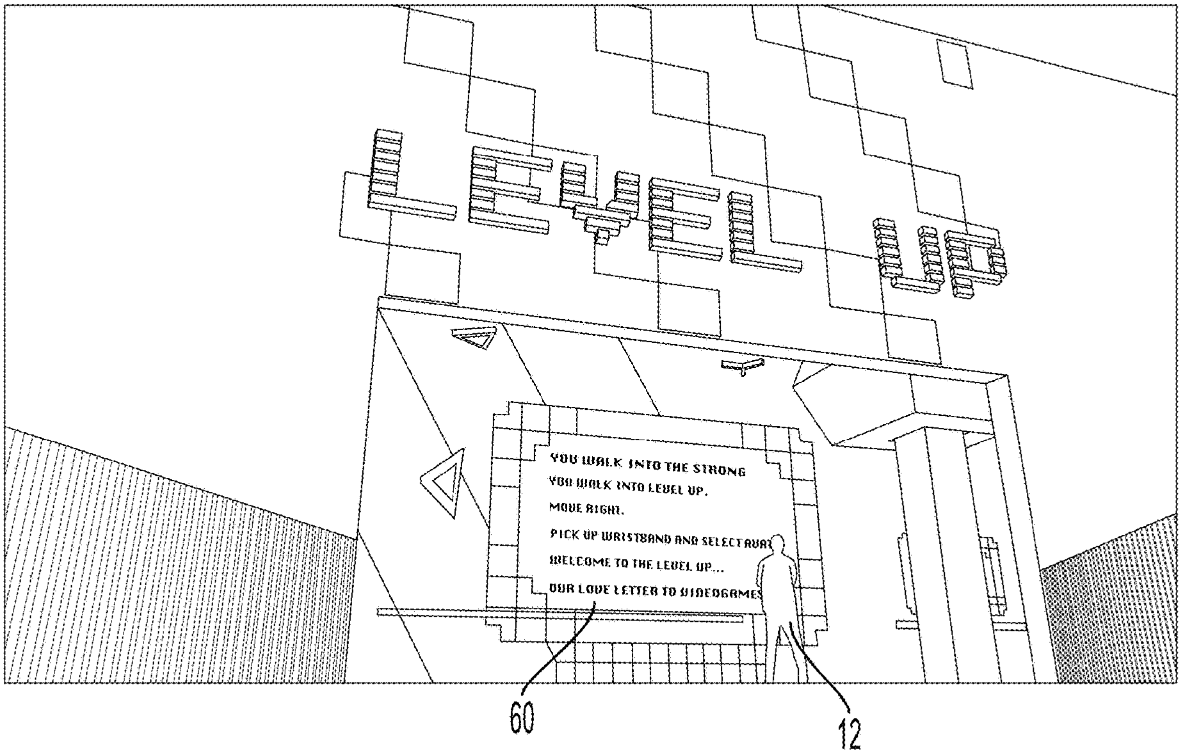
FIG. 4 is a perspective view of the exhibit showing a portion of the orientation gallery.
Figure 5:
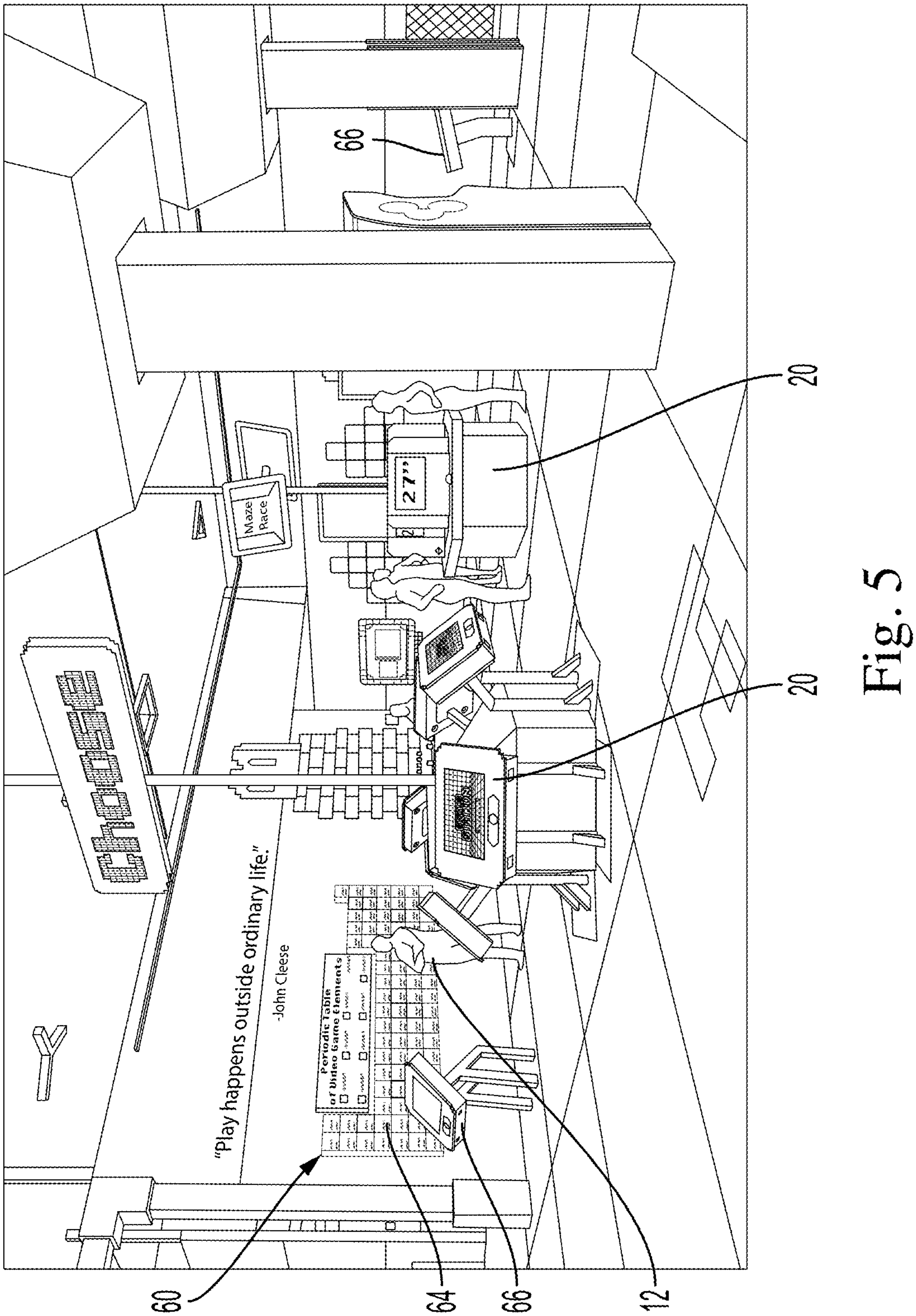
FIG. 5 is a perspective view of a portion of a the orientation gallery.
Figure 6:
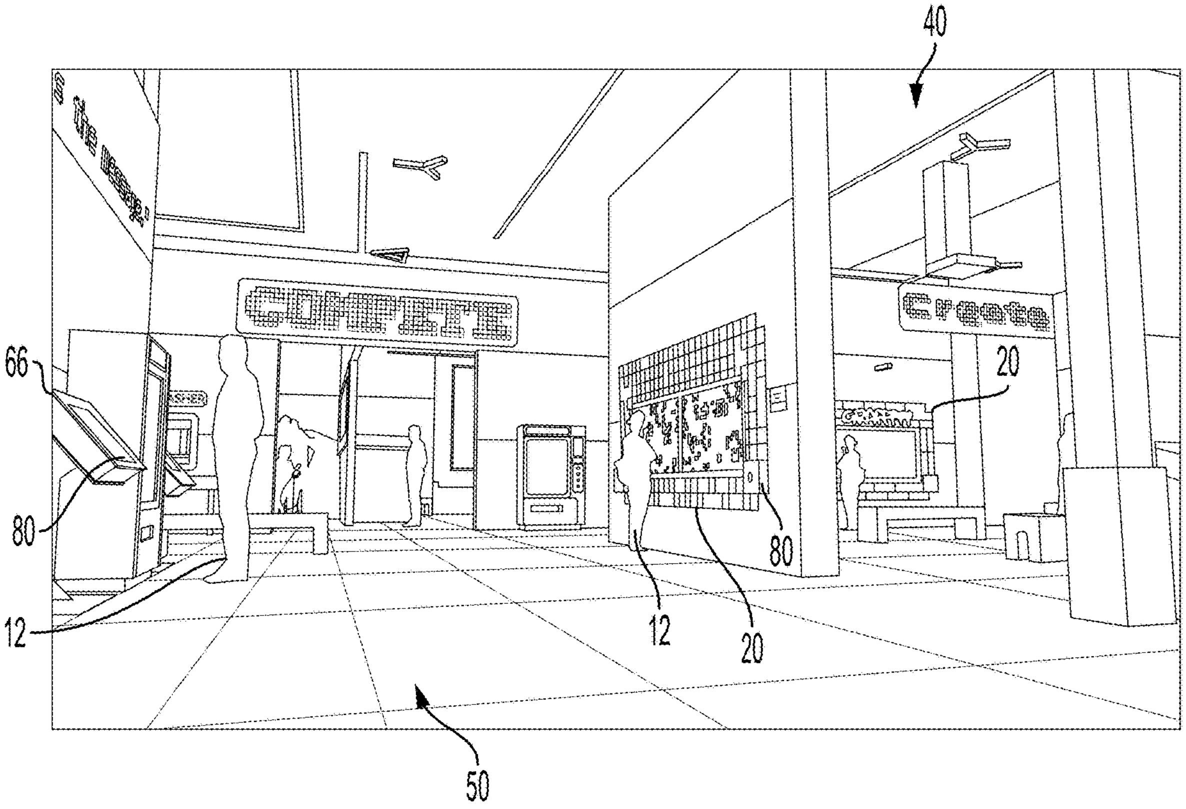
FIG. 6 is a is a perspective view of the exhibit showing two separate galleries.
Figure 7:
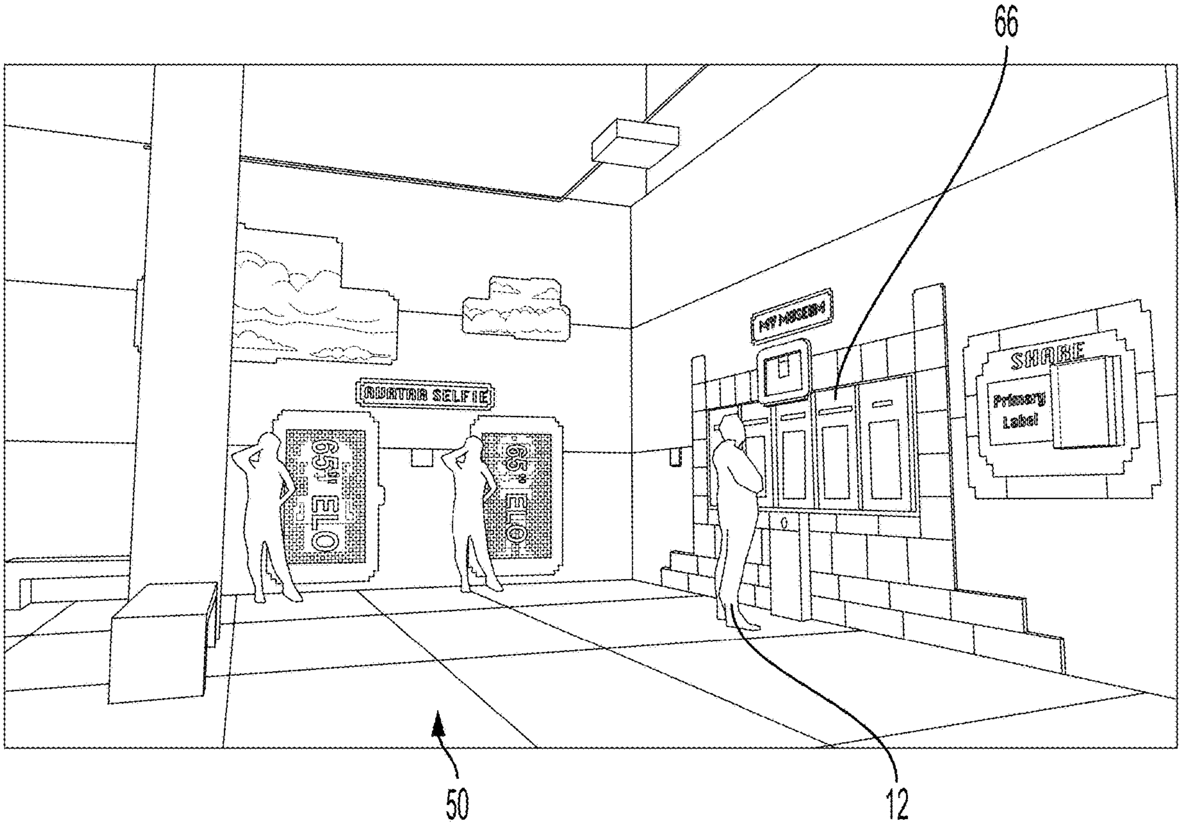
FIG. 7 is a perspective view of a gallery of the exhibit.

Referring to FIG. 1, the exhibit 10 includes a plurality of video game related interactives 20, a first gallery 40, a second gallery 50, a periodic table public display 60 of a periodic table 64, a tag 70, a reader 80, and a computer 100.

The video game related interactives 20 can include traditional interactive video games, such as screen interface games, as well as non-screen based activities, wherein the video games can include interactive digital or computer-based games played on a screen, such as a television or computer monitor, using a device such as a controller, keyboard, or mouse. In certain configurations, the video games typically involve a player controlling a character or avatar and navigating through a virtual environment, solving puzzles, and/or competing against other players or computer-controlled characters. Video games can be found in various genres, like action, adventure, sports, racing, RPG, simulation, and can be played on different platforms such as computers, consoles, mobile devices, and arcade machines. It is understood the video game related interactives 20 can include an activity or exercise associated or related to a video game, as set forth below.

The plurality of video game related interactives 20 can thus include any of a variety of commercially available or previously available interactive video games, such as but not limited to Pong, Asteroids °, Centipede Millipede® by Atari and Galaga®, Pac-Man Galaxian® by Bandai Namco Entertainment, as well as Q*bert® by Columbia Pictures Industries, Inc. The video game related interactives 20 can include single player as well as multi-player games. The interactive video games 20 can also include console-based games such as PlayStation® by Sony Interactive Entertainment, Nintendo Switch® systems, or Xbox® by Microsoft. The interactive video games 20 can also include computer based games such as developed by commercially available software, such as, but not limited to Unity by Unity Technologies.

As set forth above, the plurality of video game related interactives 20 can include non-screen based activities, such as but not limited to guest body movements, or moving, relocating, or finding physical objects by the guest 12 in the respective gallery 40, 50, or the exhibit 10.

Interaction of the guest 12 and the video game related interactives 20 generates game data. The game data can include accomplishments, achievements, participation, scores, inventory, or progress of the guest 12 in, or from, the respective video game related interactive 20. The video game related interactives 20 can be configured to permit multiple attempts, single attempts, or timed interaction with the respective video game related interactive.

The first and the second galleries 40, 50 are separate physical locations in the exhibit 10. In one configuration, the first and second galleries 40, 50 are rooms separated by a wall, wherein the wall may include a door or a window. It is also contemplated the galleries 40, 50 be separated by physical distance in the absence of a separating wall, such as different areas in an open plan exhibit 10. It is understood the galleries 40, 50 can also be separated by physical location on different floors within the exhibit 10. While the present description is set forth in terms of two galleries, it is understood there can be one, three, four, five, six, seven, eight or more galleries, depending on the number of corresponding categories, as set forth below. Further, it is contemplated that the correspondence between the number of galleries to the number of categories can be 1:>1; 1:1, or 1:<1. For example, in one configuration, there can be five galleries for presenting nine categories.

In one configuration, the galleries 40, 50 of the exhibit 10 are a series of modular rooms or sections that present guests 12 with experiences inspired by selected key verbs of screen based video games, and particularly as set forth in the periodic table 64, such as bounce, move, feel, or solve, as set forth below. Each gallery 40, 50 can be themed in a coherent manner with a combination of interactives, artifact displays, interpretive materials, graphics, photo-ops, and other features that align with the governing category (generic verb as set forth below) for that gallery. The galleries 40, 50 are configured to be experienced in a free-choice, rather than sequential, approach. However, it is understood the galleries 40, 50 can be configured to provide a sequential path through the gallery. The gallery 40 and/or 50 can include artifacts and interpretation to provide guests 12 with a chance to further experience the subject matter of each gallery. It is further contemplated that guests 12 can gain achievements, credit, or extra points (if there is an overall scoring system in place) by answering trivia questions about the displays within the gallery 40, 50.

The public display 60 provides the periodic table 64 in a visual display or presentation and includes a monitor or display as well as combinations or collections of monitors which can be configured as a single display or a plurality individual displays. The public display 60 of the periodic table 64 can include, but is not limited to, LCD, OLED, CRT, and projectors as known in the art. There can be a single public display 60 or a plurality of public displays connected to the computer 100.

In one configuration, there is at least one status station 66 associated with a specific one of the public displays 60 displaying the periodic table 64 or a video game related interactive 20. The status station 66 includes a display, and can include a processor that can be configured to cooperate with the computer to interact with at least one of the public displays 60, and typically such as a public display viewable from the status station.

In one configuration, the tag 70 is a wireless non-contact radio frequency data transfer device, such as but not limited to radio frequency identification device (RFID), such as, but not limited to a passive RFID tag or an active RFID tag, as known in the art. It is contemplated the tag 70 can provide near field communication. It is further contemplated the tag 70 can be a magnetic strip card. The tag 70 can be incorporated into a wrist band for the guest 12 as known in the art.

The reader 80 is complementary to the tag 70 and is configured to communicate, such as wirelessly, with the tag and in one configuration provide two-way communication with the tag. In one configuration, there is one reader 80 associated with each video game related interactive 20 as well as the public display 60.

The computer 100 is operably connected to or can communicate with each video game related interactive 20, each reader 80, the status stations 66, and the periodic table public display 60. The computer 100 can be connected to the video game related interactives 20 through cabling or wireless communication as well known in the art. The computer 100 includes one or more processors, a user interface, as well as a memory 110, and a display. The computer 100 can be a dedicated processor(s), a local network, or a cloud-based processor configured to perform the operations set forth herein.

The computer 100 interacts with a database 120, wherein the database is stored in the computer or accessible memory. The database 120 includes a set of categories including at least a first category 122 and a second category 124, wherein each category includes a plurality of identified activities 132, 134, respectively, as achievements.

Generally, each category 122, 124 is a generic concept or verb and the identified activities within a given category are species or examples of that generic concept or verb, wherein the identified activities can be employed as achievements. That is, the categories 122, 124 are a class or division of things/verbs/characteristics with similar features or qualities, wherein each category has a plurality of elements such as skills, action, or members (identified activities 132, 134), which can be employed as achievements. For purposes of description, each category 122, 124 is a generic verb and the elements are species of verbs set forth as identified activities 132, 134. These categories 122, 124 and identified activities 132, 134 correspond to the plurality of video game related interactives 20 in the exhibit 10. That is, each category 122, 124 is a generic term selected to encompass a first subset of the plurality of video game related interactives 20 and the identified activities 132, 134 in that category are species or examples of the generic term for the category. In one configuration, the game play of a given video game related interactive 20 is within at least one category 122, 124 (and particularly the assigned category) and the game play requires or includes at least one of the identified activities 132, 134 within the category as available achievements for completion of the periodic table 64. Therefore, a correspondence exists between the identified activities 132, 134 and the respective category 122, 124, and between the categories (and hence identified activities within the category) and the subset of the video game related interactives 20. Further, in one configuration, each video game related interactive 20, such as a video game or physical activity, in the exhibit 10 is encompassed by at least one category 122, 124 and requires at least one identified activity 132, 134 within that category during game play of the video game related interactive.

As relating to the video game related interactives 20, in one configuration, the categories 122, 124 are generic verbs and the identified activities 132, 134 within the given category are species or examples of the generic verb. For example, a first category can be the generic verb Create, with the examples (species) of identified activities including build (Bd), compose (Cs), craft (Cr), grow (Gw), modify (Mo), program (Pm), sculpt (Sc), and simulate (Si). A second category can be the generic verb Share, with the examples (species) of identified activities including cooperate (Co), communicate (Cm), give (Gv), pact (Pc), show (Sh), signal (Sn), team (Tm), and write (Wr). A third category can be the generic verb Solve with the examples (species) of identified activities including calculate (Cl), decipher (Dp), decode (Dc), guess (Gu), investigate (Iv), map (Mp), measure (Ms), plan (Pl), puzzle (Pz), reason (Rsn). A fourth category can be the generic verb Move with the examples (species) of identified activities including climb (Cb), crawl (Cw), dance (Dn), drag (Dg), fall (Fa), fly (Fy), gesture (Gs), hit (Ht), hover (Hv), jump (Jp), launch (Ln), lift (Lf), push (Ps), roll (Rl), run (Rn), slide (Sl), sneak (Sk), spin (Sp), swim (Sw), swing (Sg), walk (Wa), wander (Wd), and zoom (Zm). A fifth category can be the generic verb Choose with the examples (species) of identified activities including align (An), ally (Al), discern (Ds), judge (Jg), prioritize (Pz), sort (St), finish (Fn), match (Ma), risk (Rk), and specialize (Sz). A sixth category can be the generic verb Compete with the examples (species) of identified activities including defeat (Df), fail (Fl), fight (Ft), gamble (Ga), improve (Ip), outwit (Ow), overcome (Oc), practice (Pt), and race (Rs). A seventh category can be the generic verb Feel with the examples (species) of identified activities including accomplish (Ap), achieve (Ac), anxiety (Ax), appreciate (At), conflicted (Cf), confused (Cu), hopelessness (Hl), kindness (Kd), love (Lv), pride (Pd), rage (Rg), relief (Rf), and resolute (Rs). An eighth category can be the generic verb learn with the identified activities of absorb (Ab), apprentice (Ar), determine (Dt), encounter (En), habituate (Hb), improvise (Im), level-up (Lu), locate (Lo), observe (Ob), remember (Rm), retry (Re), train (Tr), and understand (Un). A ninth category can be the generic verb collect with the identified activities of archive (Av), arrange (Ag), assemble (Am), buy (By), compile (Cp), understand (Un), earn (Er), experience (Ex), gather (Gr), inventory (In), merge (Mg), and pile (Pi).

It is readily understood the categories 122, 124 can be any of a variety of classes or classifications and are not limited to the specific categories set forth herein. Similarly, the identified activities 132, 134 can be any of a number of activities corresponding to or encompassed within the respective category 122, 124.

Figure 8:
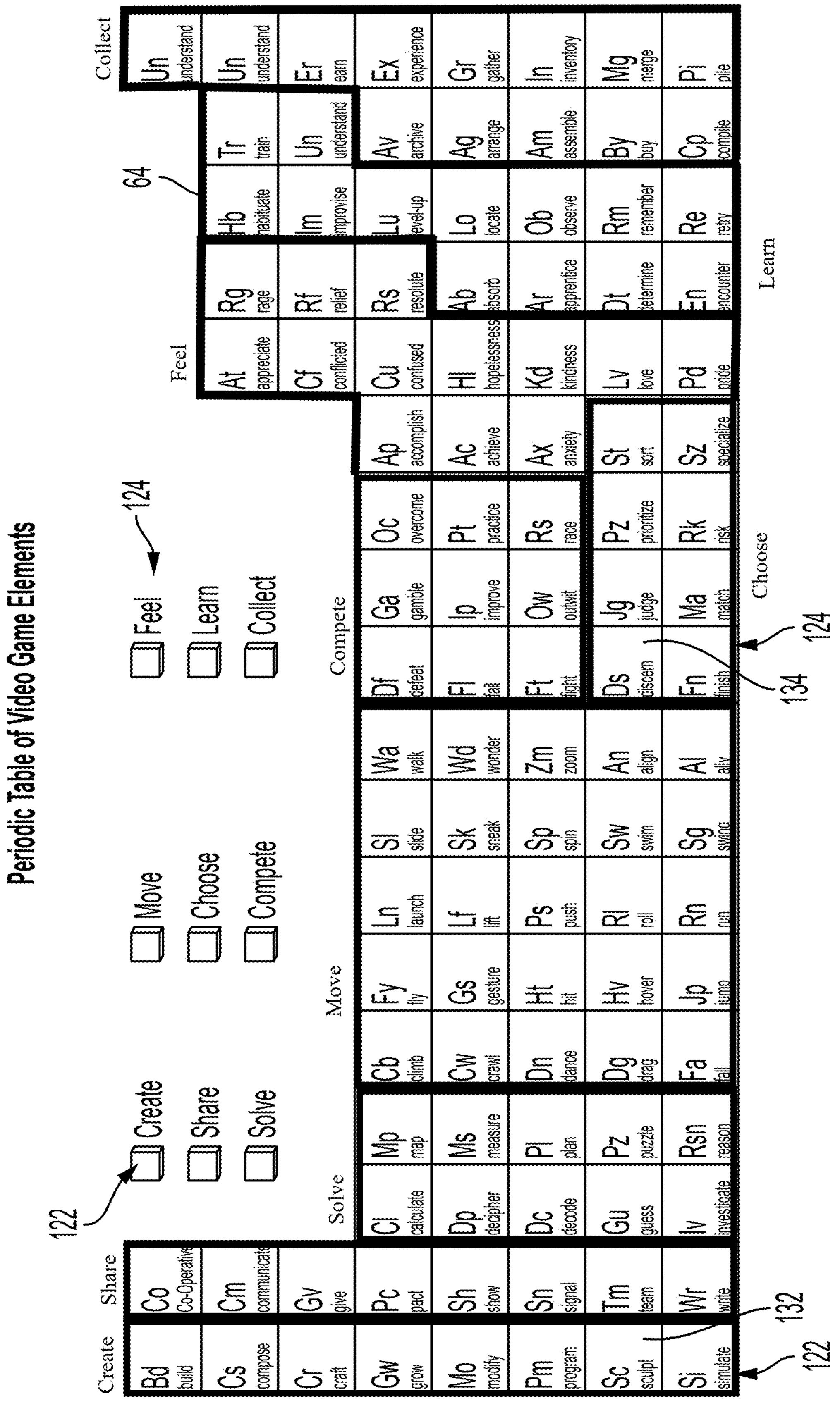
FIG. 8 is a representative periodic table.
Figure 9A:
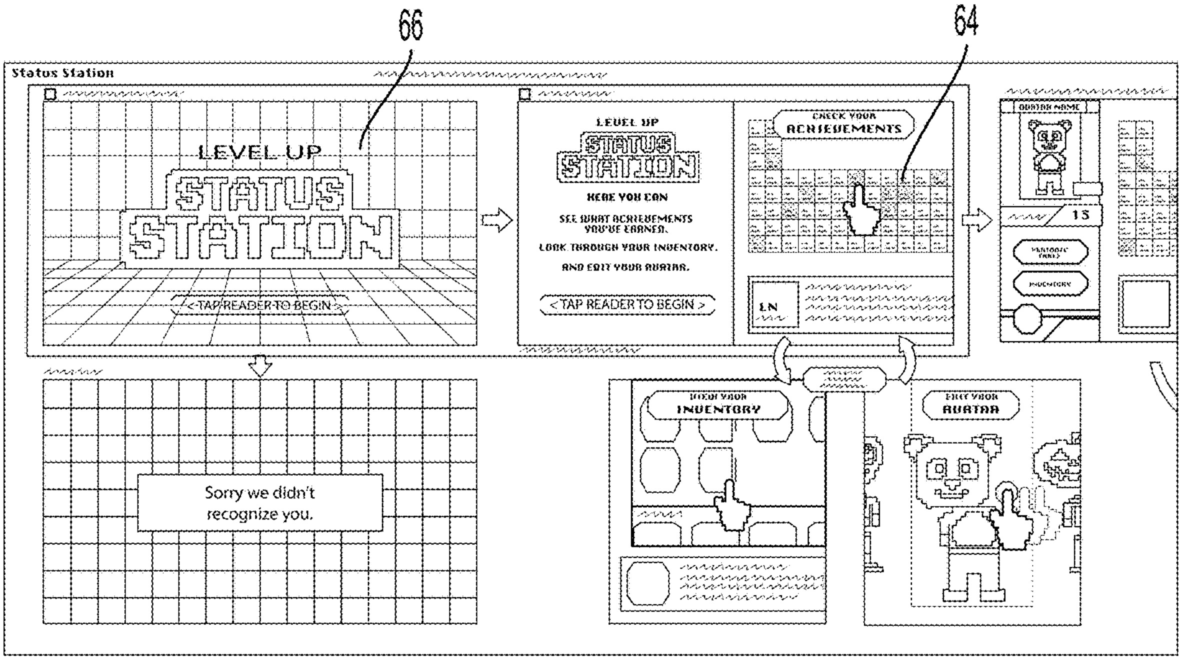
FIGS. 9A and 9B are a representative flow chart of guest interaction with the exhibit.
Figure 9B:
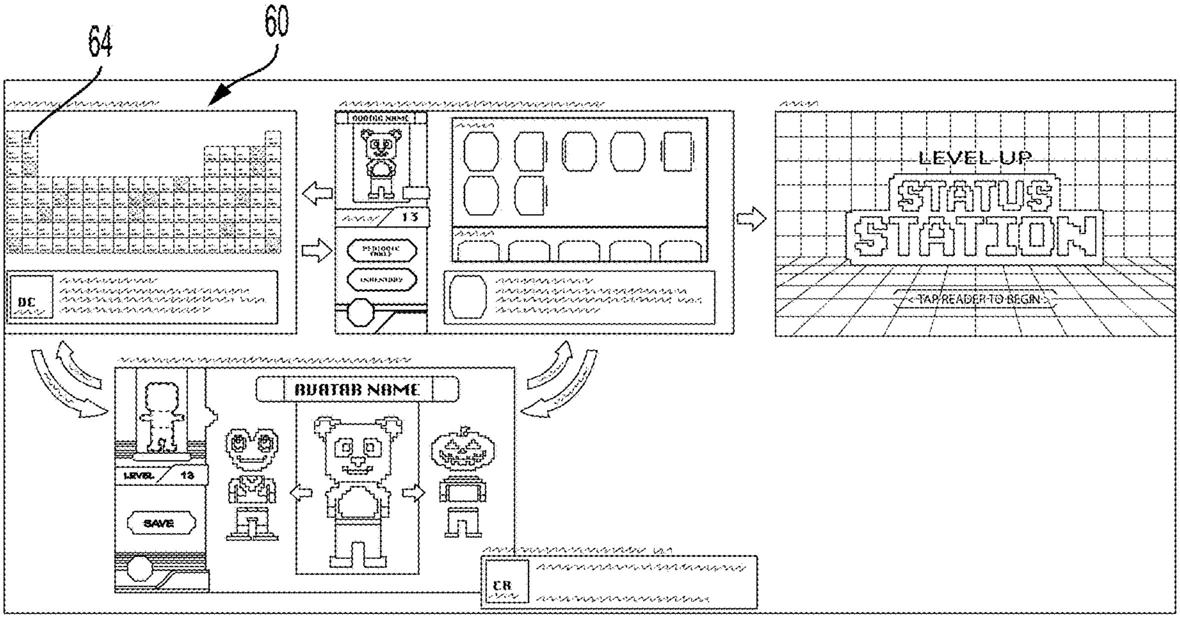

The computer 100 is configured to tally, such as add or combine or tabulate, the game data as the identified activities 132, 134 within the categories, wherein the display is a tabular array, such as the periodic table 64, as seen in FIGS. 1 and 8. The computer 100 is further configured to process received game data from the video game related interactives 20, such as results, achievements, or completions, and tabulate a running tally of the identified activities achieved by the guest associated with the given tag 70 (and game data). Referring to FIGS. 9A and 9B, the tally is maintained by the computer 100 and can be stored in the memory 110. The status station 66 can receive a signal from the tag 70 at the reader 80 and generate a display of the progress of the guest through at least one of the status station 66 and the display 60, such as the tallied score of the associated tag 70.

Referring to FIG. 8, in one configuration, the array of the identified activities 132, 134 is constructed as the periodic table 64, and particularly a tabular array having 18 columns and having between 6 to 8 rows, wherein not all the columns include an entry in every row. As seen in FIG. 8, the respective categories 122, 124 can be defined by areas or colored portions of the array, wherein the identified activities 132, 134 within the given category are contiguous within the periodic table 64. In addition, each identified activity 132, 134 can include an abbreviation, and particularly a one-letter, or two-letter abbreviation as in the standard periodic table of elements.

In the known periodic table of the chemical elements, the periodic table provides a graphic formulation of the periodic law, which states that the properties of the chemical elements exhibit a periodic dependence on their atomic numbers. In some configurations, the periodic table is divided into four roughly rectangular areas called blocks. The rows of the table are called periods, and the columns are called groups. Elements from the same column group of the periodic table show similar chemical characteristics, wherein the table is organized for trends that run through the table.

Similarly, the present periodic table 64 is an array of the game elements (identified activities 132, 134), wherein in one configuration the identified activities of a given category 120, 122 are contiguous within the periodic table. Referring to FIG. 8, the present periodic table 64 employs associated generic verbs within a common blocks (categories 120, 122) seen as a common color in the periodic table 64, wherein the elements (identified activities 132, 134) within the block are examples of that block. For example, there may be a block of ten elements all of the same category, such as choose, and having the same color, wherein the examples (species) of identified activities include align (An), ally (Al), discern (Ds), judge (Jg), prioritize (Pz), sort (St), finish (Fn), match (Ma), risk (Rk), and specialize (Sz). It is contemplated that all the identified activities 132, 134 within a given category are contiguous in the periodic table 64.

The organization of the galleries 40, 50, the video game related interactives 20, the periodic table 64, and the computer 100 is set by the categories 122, 124 and the identified activities 132, 134 within each category. For example, one of the galleries 40, 50 can be configured to include the categories of create and solve, wherein the video game related interactives 20 within the gallery provide opportunities to achieve the various identified activities of build (Bd), compose (Cs), craft (Cr), grow (Gw), modify (Mo), program (Pm), sculpt (Sc), and simulate (Si) with create and calculate (Cl), decipher (Dp), decode (Dc), guess (Gu), investigate (Iv), map (Mp), measure (Ms), plan (Pl), puzzle (Pz), reason (Rsn) within solve.

The present disclosure provides for assigning at least one category 122, 124 and at least one identified activity 132, 134 to each of the video game related interactives 20. It is contemplated that a single video game related interactive 20 may be in more than one category 122, 124. Similarly, it is contemplated that a single video game related interactive 20 may be linked to only one activity 132 or to a plurality of activities 132, 134, wherein the activities may be in a single category or may from a plurality of categories. In one configuration, there is at least one occurrence of each activity 132, 134 within the exhibit 10, and particularly, within the galleries 40, 50.

In one configuration, these assigned categories 122, 124 and the identified activities 132, 134 determine the physical location of the respective video game related interactive 20 within the exhibit 10 and particularly the galleries 40, 50. Video game related interactives 20 providing activities within a given category 122, 124 are physically located within a corresponding gallery 40, 50 in the exhibit 10.

It is anticipated that at least a majority, or all, or a predetermined subset of the plurality of video game related interactives 20 need to be played in order to perform the identified activities (achievements) in the periodic table 64 and thus work towards completing the periodic table.

As seen in FIG. 1, the exhibit 10 can include at least one status station 66, which is operably connected to the computer 100 and includes the reader 80, as well as a user (guest) interface configured to permit data entry from the guest associated with a given tag. The status station 66 can include or be located adjacent the display 60 of the periodic table 64. The status station 66 can be configured to provide the user interface for a guest to respond to questions about the associated video game related interactive 20, as well as earn credit as depending upon the video game related interactive 20.

In addition, the exhibit can include an orientation gallery 54 configured to first interface with guests 12, link the guest with the tag 70, and provide an overview of the exhibit 10 as well as present the public display 60 of the periodic table 64.

In operation, the guest 12 enters the exhibit 10 through the common orientation gallery 54 that introduces the guest to the exhibit and allows the guest to link to the tag 70 that allows the guest to track their scores on the periodic table 64 of the exhibit. In certain configurations, the guest 12 can also create an avatar, as seen in FIGS. 9A and 9B, that is linked to the tag 70. The tag 70 is identified and linked in the database 120 by the computer 100, such as by a corresponding account. Depending on the configuration of the exhibit 10, the guest 12 can also use the status station 66 to generate or link an avatar to the tag 70, and account if used. It is contemplated the status station 66 can include a display or projector that projects the periodic table 64 (tabular array) of the categories 122, 124 and identified activities 132, 134. The guest 12 can thus see the periodic table 64 and study the categories 122, 124 and identified activities 132, 134. The guest 12 can select a given category 122, 124 to initially visit and move to the gallery 40, 50 that corresponds to the selected category. In addition, the status station 66 can provide which video game related interactive 20 within a given gallery 40, 50 provides the opportunity to accomplish certain identified activities (achievements) in the periodic table 64.

Referring to FIGS. 2-7, guests 12 then pass further into the exhibit 10 to the galleries 40, 50 (and video game related interactives 20 in the gallery) that are organized into experience areas themed around the key verbs of the category 122, 124 of the video game related interactives 20. Guests 12 have free choice to go throughout the exhibit 10 in any order. It is further contemplated the guests 12 can engage in missions, quests, achievements, or meta-achievements in which the guest needs to complete a series of tasks to bolster the experience/points achieved by their avatar or character, as tracked through association of the tag 70 and connected to the computer 100. The meta-achievement is an achievement that is earned by completing a specific set of other achievements, the identified activities 132, 134, the categories 122, 124, or the video game related interactives 20. Thus, the meta-achievement is a type of reward that recognizes the completion of a group of related tasks or objectives within a larger system. The meta-achievements can function as an incentive for the guest 12 to explore different aspects of the exhibit 10, and to complete a wide range of tasks, rather than just focusing on a single goal. It is contemplated the meta-achievement can also be used to showcase a mastery or completion of a particular game or platform, such as a rank or ranking, as well as to add an extra layer of challenge and game replay. For example, with respect to the periodic table 64, the meta-achievement might be earned by completing all of the identified activities 132 within a category 122, or by completing the identified activities 132 within a category 122 in a specific order. The meta-achievement can provide guests 12 with an additional sense of accomplishment and to encourage them to engage with the exhibit 10 in new and meaningful ways.

As the guest 12 proceeds to the gallery 40, 50 of interest and selects a video game related interactive 20 of interest, their tag 70 is read at the reader 80 of the video game related interactive. By reading the tag 70 at the reader 80, the computer 100 then associates the tag (and hence guest) with the specific video game related interactive 20 and any corresponding generated game data. It is contemplated the guest 12 can confirm the availability of certain identified activities at the respective video game related interactive 20, so as to control their progress in filling the periodic table 64.

As the guest 12 interacts with the video game related interactive 20, corresponding game data is generated and transmitted to the computer 100. The computer 100 tallies the activities performed or accomplished by the guest 12 and updates the database 120 to reflect the generated game data. Thus, upon a subsequent query, the computer 100 can display the fulfilled identified activities (achievements) on the periodic table 64 for the guest 12.

In the present system, the action of the guest 12 separates the video game related interactives 20 from traditional passive media such as movies, television, and books. The categories 122, 124 and corresponding selected identified activities 132, 134, such as verbs, are the identified building blocks of the video game related interactives 20 of the exhibit 10. The present exhibit 10 is based on the periodic table 64 of video game categories 122, 124 (activities 132, 134) that will help the guest 12 understand how verbs like move, choose, solve, create, compete, collect, share, learn, and feel combine to make video game related interactives 20 unique and special. As set forth above, the present periodic table 64 is based on an analysis of the video games from their early development from approximately 50 years ago to the games of today. The present periodic table 64 of the interactive video game categories 122, 124 and identified activities 132, 134 (elements) provides: (i) an intellectual organization of the video games, allowing scholars, exhibit guests 12, and others to understand what are the key elements of video games; (ii) a spatial organization of the exhibit 10, serving as the basis for the floorplan of the galleries 40, 50 in the exhibit; and (iii) an experiential organization of the guest visit undergirding an achievement system in which guests participate in activities throughout the exhibit that are linked via the tag 70, such as the RFID-enabled wristband to a larger metagame, the periodic table 64, that tracks their progress in relation to achievements (identified activities correlating with verbs) in the periodic table of elements.

Figure 10:
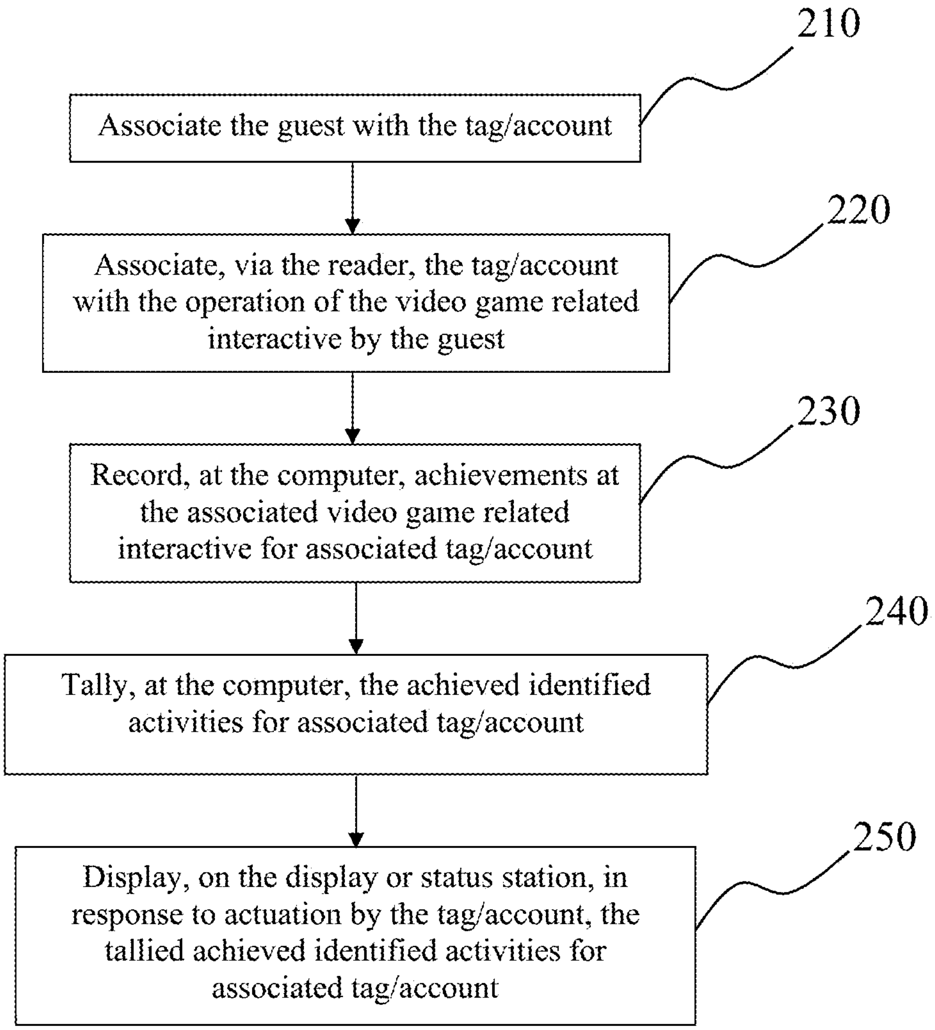
FIG. 10 is a representative flow chart of the processing of the computer.

Referring to FIG. 10, an algorithm of the computer 100 is shown, wherein the guest 12 is associated with a given tag 70, or account at step 210. This is typically performed at the orientation gallery 54. In response to the tag 70 being read at the reader 80, the computer associates the achievement, score, or interaction with the associated video game related interactive 20 with the tag, as shown at step 220. The computer 100 records the game data at the associated video game related interactive 20, and typically stores the game data in the memory 110, as shown at step 230. The computer 100 then tallies the game data for the associated tag 70, and particularly relative to the periodic table 64, as shown at step 240. At step 250, the computer 100 can generate a display of the tallied game data for the presentation at the status station 66 or public display 60.

The present disclosure thus provides a system configured to meet educational, interpretive, and experiential goals in the immersive exhibit 10 including, but not limited to (i) bringing video games to life in new, unexpected, creative ways that help guests better appreciate through play the essential elements of video games, past and present, (ii) creating interactives and interpretation inspired by the video games that enrich guests, intellectually, physically, socially, and emotionally, (iii) featuring a wide-range of experiences that reflect multiple learning styles and preferences, and (iv) providing experiences that are fun, memorable, and repeatable.

The present disclosure provides for the immersive video games exhibit 10 to educate and inform about the structures and history of video games, provide a unique and memorable exhibit on a regional, national, and international basis, support the interpretation of video games and their history, and provide new ways of using play to engage guests in deep learning and fun. The present system encourages guests to play the interactive video games individually and collectively in ways inspired by and drawn from the history of the video games.

Thus, in one configuration, the present disclosure provides an immersive exhibit comprising a plurality of video game related interactives, wherein each video game related interactive is assigned at least one category and at least one identified activity within the category, wherein the categories and associated identified activities are game elements of the video game related interactive and displayed in the periodic table, and wherein a guest is provided the tag to track interactions with the plurality of video game related interactives as the guest seeks to complete the achievements (identified activities) of the periodic table.

This disclosure has been described in detail with particular reference to an embodiment, but it will be understood that variations and modifications can be effected within the spirit and scope of the disclosure. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. An immersive exhibit system for a guest, the immersive exhibit system comprising:

(a) a first gallery in the exhibit;

(b) a spaced apart second gallery in the exhibit;

(c) a database having a set of categories including at least a first category and a second category, wherein each category is a generic verb and includes a plurality of identified activities that are species of the respective generic verb;

(d) a plurality of different video game related interactives configured to generate game data corresponding to an interaction with the guest, wherein each of the plurality of video game interactives is a member of at least one category and has at least one assigned identified activity within the at least one category, wherein a first subset of the plurality of video game related interactives is assigned the first category with a first assigned identified activity and is physically located in the first gallery and a second subset of the plurality of video game related interactives is assigned the second category with a second assigned identified activity and is physically located in the second gallery;

(e) a public display of a tabular array arranged in a periodic table format comprising the first category with the first assigned identified activity associated with the first subset of the plurality of video game related interactives that is physically located in the first gallery and the second category with the second assigned identified activity associated with the second subset of the plurality of video game related activities that is physically located in the second gallery, wherein the identified activities within each respective category are displayed contiguously within the tabular array;

(f) a tag associated with the guest;

(g) a reader configured to associate the tag with a given one of the plurality of video game related interactives; and (h) a computer operably connected to the reader, the database, the display, and the plurality of video game related interactives, the computer configured to receive game data from the given one of the plurality of video game related interactives and tally of the associated tag corresponding to the set of categories and the identified activity with the at least one category, wherein the computer is further configured to selectively display the tally of achieved identified activities on the public display comprising the tabular array arranged in a periodic table format.

2. The system of claim 1, wherein a number of activities is greater than the number of categories.

3. The system of claim 1, wherein each generic verb of each category is a generic activity encompassing the plurality activities within the at least one category.

4. The system of claim 1, wherein a subset of the plurality of video game related interactives are video games.

5. The system of claim 1, further comprising linking an avatar to the tag, wherein at least one of the video game related interactives is configured to include the avatar in game play.

6. The system of claim 1, wherein the tag is a passive radio frequency identification device (RFID) tag.

7. The system of claim 1, wherein the tag is an active radio frequency identification device (RFID) tag.

8. The system of claim 1, wherein the tag is a wireless non-contact radio frequency to transfer data.

9. The system of claim 1, wherein the tag provides near field communication.

10. The system of claim 1, further comprising a status station which displays the number of identified activities achieved by the user from a subset of the video game related interactives.

11. The system of claim 1, wherein the first category is a first generic verb and the second category is a second generic verb different from the first generic verb.

12. The system of claim 1, wherein the first assigned identified activity is a first achievement and the second assigned identified activity is a second achievement different from the first achievement.

13. The system of claim 12, wherein the achievements are tallied and selectively displayed on the tabular array in the periodic table format.

14. A method of providing an immersive exhibit for a guest, the method comprising:

(a) associating each of a plurality of video game related interactives with one of a plurality of categories, a first subset of the plurality of video game related interactives associated with a first category and located in a first gallery and a second subset of the plurality of video game related interactives associated with a second category and located in a second gallery, wherein the first category is a generic verb describing the first subset of the plurality of video game related interactives and the second category is a generic verb describing the second subset of the plurality of video game related interactives;

(b) assigning each of the plurality of video game related interactives in a given category at least one of a plurality of identified activities, wherein the plurality of identified activities are species of the given category;

(c) linking, by a computer, a portable tag to the guest;

(d) recognizing the tag at a given one of the plurality of video game related interactives to designate a selected one of the plurality of video game related interactives;

(e) generating, by interaction by the guest, game data at the selected one of the plurality of video game related interactives corresponding to the interaction with the selected one of the plurality of video game related interactives by the guest;

(f) receiving, at the computer, the generated game data from the selected one of the plurality of video game related interactives and associating the received game data with the recognized tag;

(g) tallying, by the computer, the received game data for the recognized tag; and (h) displaying, at a public display and in response to guest input of the recognized tag, at least a portion of the tallied game data for the recognized tag in a tabular array arranged in a periodic table format, the periodic table including the first category with the at least one of the plurality of identified activities associated with the first subset of the plurality of video game related interactives physically located in the first gallery and the second category with the at least one of the plurality of identified activities associated with the second subset of the plurality of video game related activities physically located in the second gallery wherein the identified activities within the respective category are contiguous in the tabular array in the periodic table format.

15. The method of claim 14, further comprising linking an avatar to the linked tag.

16. The method of claim 14, wherein the tag is a radio frequency identification device (RFID) tag.

17. The method of claim 14, further comprising displaying an avatar linked to the guest as a part of the given video game related interactive.

18. The method of claim 14, further comprising assigning a first generic verb as the first category and a second generic verb as the second category, which second generic verb is different from the first generic verb.

* * * * *